United States Patent Office 2,968,666
Patented Jan. 17, 1961

2,968,666

CHLOROCYANOALKENYLSILICON COMPOUNDS

Enrico J. Pepe, Kenmore, N.Y., assignor to Union Carbide Corporation, a corporation of New York No Drawing. Filed Aug. 3, 1959, Ser. No. 831,048

10 Claims. (Cl. 260—448.2)

This invention relates to novel carbofunctional organosilicon compounds and to a process for their production. More particularly, this invention relates to chlorocyanoalkenylsilicon compounds and to a process for their production.

The compositions of the instant invention are organosilicon compounds containing at least one silicon-bonded chloro-2-cyanoalkenyl group of the formula:

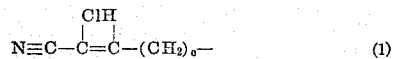
(1)

wherein $(c)$ is an integer of from 0 through 4, preferably $(c)$ is 0, 1 or 2, the organosilicon compound is selected from the class consisting of (1) organosilanes having at least one valence of silicon, other than the valences satisfied by the chlorocyanoalkenyl group, satisfied by a hydrogen atom, chlorine atom, fluorine atom or an alkoxy group, the remaining valences of silicon being satisfied by methyl and phenyl groups and (2) organosiloxanes having all of the valences of the silicon atom containing the chlorocyanoalkenyl group, other than the valences satisfied by said chlorocyanoalkenyl group and siloxane linkages satisfied by methyl and phenyl groups and all remaining valences of silicon of said organosiloxane other than the silicon containing said chlorocyanoalkenyl group satisfied by monovalent hydrocarbon groups. The compositions of this invention are hereinafter referred to as chlorocyanoalkenylsilicon compounds.

Thus, the chlorocyanoalkenylsilicon compounds of this invention include monomeric silanes and polymeric siloxanes.

The monomeric silanes of this invention are the organosilanes represented by the formula:

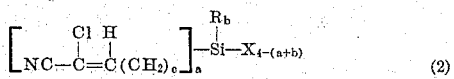
(2)

wherein $(c)$ is as above defined, R is a methyl group or a phenyl group, X is a chlorine, fluorine, or an alkoxy group, $(a)$ is an integer of from 1 through 3, $(b)$ is an integer of from 0 through 2 and the sum of $(a)$ and $(b)$ is from 1 through 3. Illustrative of the chlorocyanoalkenylsilanes of this invention are 2-chloro-2-cyanovinyltrichlorosilane, 6-chloro-6-cyanohexenyltrichlorosilane, 2-chloro-2-cyanovinyltriethoxysilane, 2-chloro-2-cyanovinyltributoxysilane, 3-cyano-3-chloro-2-propenyltrifluorosilane and the like, di-(2-chloro-2-cyanovinyl)dichlorosilane, di-(2-chloro-2-cyanovinyl)dialkoxysilane, di-(3-cyano-3-chloropropenyl)dichlorosilane and the like; tri-(2-chloro-2-cyanovinyl)fluorosilane, tri-(2-chloro-2-cyanovinyl)alkoxysilane and the like; (2-chloro-2-cyanovinyl)-phenyldichlorosilane, (4-chloro-4-cyanobutenyl)methyldichlorosilane, (2-chloro-2-cyanovinyl)-ethyldiethoxysilane and the like. Illustrative of the alkoxy groups that are represented by X are methoxy, ethoxy, propoxy, butoxy, stearoxy and the like.

The polymeric siloxanes of this invention include those organosiloxanes containing units of the formula:

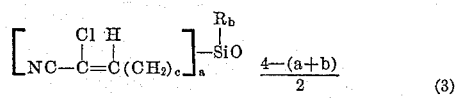
(3)

wherein R, $(a)$, $(b)$ and $(c)$ have the above-defined meanings and the sum of $(a)$ and $(b)$ is from 1 through 3. These polymeric siloxanes include the trifunctional siloxanes, difunctional siloxanes and monofunctional siloxanes. The monofunctional siloxanes of this invention are those having units of the above formula where the sum of $(a)$ and $(b)$ is 3. These monofunctional siloxanes are, for example, bis-(2-chloro-2-cyanovinyl)tetramethyldisiloxane, bis-(3-chloro-3-cyano-2-propenyl)tetramethyldisiloxane, tetra-(2-chloro-2-cyanovinyl)diphenyldisiloxane, [tetra-(3-chloro-3-cyano-2-propenyl)]dimethyldisiloxane, hexa-(2-chloro-2-cyanovinyl)disiloxine and the like. The difunctional siloxanes of this invention are those having units of Formula 3 where the sum of $(a)$ and $(b)$ is 2 and include linear siloxanes having a number of such units, for example, 2-chloro-2-cyano-vinylmethylpolysiloxane, 3-cyano-3-chloro-2-propenylphenylpolysiloxane and the like; as well as cyclic siloxanes having from 3 through 7 of such units, for example tetra-(2-chloro-2-cyanovinyl)tetramethylcyclotetrasiloxane and the like. The trifunctional siloxanes include, for example, 2-chloro-2-cyanovinylpolysiloxane, 3-chloro-3-cyano-2-propenylpolysiloxane and the like.

The polymeric siloxanes of this invention also include those having at least one unit of Formula 3 and one or more siloxane units depicted by the formula:

(4)

where R' is a monovalent hydrocarbon radical, $(d)$ is an integer of from 0 through 3 and $(d)$ need not have the same value throughout the same molecule, but is the same in each unit, and R' can represent the same or different groups within the same molecule. Illustrative of the monovalent hydrocarbon radicals that R' can represent are: alkyl groups such as methyl, ethyl, butyl and the like; alkenyl groups such as vinyl, allyl and the like; aryl groups such as phenyl, naphthyl and the like; aralkyl such as phenyethyl; alkaryl such as tolyl and the like. These polymeric organosiloxanes include end-blocked linear polymeric organosiloxane oils, cyclic organosiloxanes, and resinous organosiloxanes containing the same or different substituted mono-, di-, and tri-functional silicon atoms.

In accordance with my invention the cyanochloroalkenylchlorosilanes are prepared by the dehydrochlorination or dechlorination of polychlorocyanoalkylchlorosilanes of the formula

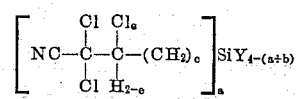

where R, $(a)$, $(b)$ and $(c)$ have the above-defined meanings, $(e)$ is an integer of from 0 through 1, the sum of $(a+b)$ is from 1 through 3, and Y is a chlorine or fluorine atom. The dehydrochlorination or dechlorination can be accomplished by several different procedures. I have found that by merely heating the polychlorocyanoalkylchlorosilane to elevated temperatures causes the evolution of chlorine or hydrogen chloride or both chlorine and hydrogen chloride and yield the chlorocyanoalkylchlorosilanes. The overall reaction is thought to take place according to the following equations which for the purpose of illustration depicts (A) the dehydrochlorination of 2,2-dichloro-2-cyanoethyltrichlorosilane and (B) the dechlorination of 2,2,1-trichloro-2-cyanoethyltrichlorosilane.

(A) $NC—CCl_2—CH_2—SiCl_3 \rightarrow NC—CCl=CH—SiCl_3 + HCl$ (B) $NC—CCl_2—CHCl—SiCl_2 \rightarrow NC—CCl=CH—SiCl_3 + Cl_2$ The temperatures to which the polychlorocyanoalkylsilane is heated can be from about 125° C. to 250° C. or even higher. It is preferred that the temperature be maintained at from about 175° C. to 225° C. so as to allow the reaction to progress at a reasonable rate while substantially preventing undesirable side reactions.

It is preferred that the reaction be carried out at atmospheric pressure. Higher pressures may be used but no commensurate advantage is gained thereby. Lower pressures may also be employed; however, since heat must be applied to split out the hydrogen chloride or chlorine it will be obvious that lower pressures would reduce the boiling temperature of the reaction mixture and reaction products thus rendering it difficult to maintain the temperature within the above preferred limits.

The chlorocyanoalkenylchlorosilanes of this invention can be esterified to yield the corresponding chlorocyanoalkenylalkoxysilanes, by reacting the chlorocyanoalkenylchlorosilanes with alcohols or a trialkoxyorthoformate. The esterification with an alcohol can be accomplished according to known procedures. The esterification with the trialkoxyorthoformate is carried out by forming an admixture of a chlorocyanoalkenylsilane and a trialkoxyorthoformate and heating the mixture to reflux. I have found that in the esterification reaction it is necessary to minimize the formation of hydrogen chloride so as to prevent undesirable side reaction such as hydrogen chloride adding to the ethylenically unsaturated group to form dichlorocyanoalkylalkoxysilanes and also to prevent the hydrolysis of the cyano group. The formation of hydrogen chloride is prevented or minimized by employing a trialkoxy orthoformate as the esterifying reagent. The addition of hydrogen chloride to the vinyl group may also be minimized by conducting the esterification with an alcohol in the presence of a hydrogen chloride acceptor such as pyridine, quinoline, tri-n-butylamine and the like.

The chlorocyanoalkenylsilanes of this invention can be hydrolyzed and condensed to yield the polymeric siloxanes and the chlorocyanoalkenylsilanes can be cohydrolyzed and co-condensed with hydrocarbon silanes of the formula:

$$R'_d Si(Z)_{4-d} \qquad (5)$$

where R' and d are as above defined and Z is an alkoxy group such as methoxy, ethoxy, propoxy, butoxy, stearoxy and the like, or a fluorine or chlorine group, to yield the polymeric siloxanes of this invention.

In the hydrolysis of the chlorocyanoalkenylchlorosilanes of this invention it is necessary to keep the concentration of the liberated hydrogen chloride as low as possible in order to prevent undesirable side reactions such as hydrolysis of the cyano group or hydrogen chloride addition to the double bond. It is for this reason that in the preparation of the polymeric siloxanes that the chlorocyanoalkenylalkoxysilanes be employed as the starting material. The chlorocyanoalkenylchlorofluorosilanes can be employed if suitable precautions are taken to avoid high concentration of hydrogen chloride. The chlorocyanoalkenylalkoxysilanes are hydrolyzed by employing a small amount of a basic or acidic catalyst. Such hydrolysis of the chlorocyanoalkenylalkoxysilanes is carried out according to the following procedure:

The chlorocyanoalkenylalkoxysilane is added to water which contains a small amount of an acidic or basic catalyst and the mixture stirred rapidly. The siloxane thus formed is extracted with a non-water miscible liquid organic solvent and the solvent solution washed with water until the water washings are neutral. The solvent is then removed by evaporation, leaving as a residue the chlorocyanoalkenylsiloxanes. The hydrocarbonsilanes of Formula 5 above also can be cohydrolyzed with the chlorocyanoalkenylsilanes to yield the polymeric siloxanes of this invention containing both units of Formula 3 and units of Formula 4.

A solvent is not necessary during the hydrolysis described above; however, a solvent may be employed if desired. Suitable solvents are, for example, isopropyl ether, diethyl ether, and the like, benzene, toluene and the like; and the diethers of ethylene glycol and polyethylene glycol and the like; alcohols such as methanol, ethanol and the like.

The temperatures at which the hydrolysis is conducted is not narrowly critical and can be from 0° C. to 100° C.; however, temperatures of from about 25° C. to about 70° C. are preferred so as to give a reasonable rate of hydrolysis and to minimize side reactions.

Catalysts that are useful in the hydrolysis are the acids or bases. Suitable acid catalysts are, for example, hydrochloric acid, sulfuric acid, oxalic acid, trifluoroacetic acid, acetic acid and the like. Suitable basic catalysts are, for example, sodium hydroxide, potassium hydroxide, ammonium hydroxide and the like. The concentration of the catalyst is not narrowly critical and can be from 0.001 N to about 2.0 N or even higher. The concentration of the catalyst is preferably kept below 1.0 N in order to prevent undesirable side reactions. It is not necessary to extract the chlorocyanoalkenylsiloxane product with a non-water miscible solvent after the hydrolysis; however, the extraction with a non-water miscible liquid organic solvent renders purification much simpler. Suitable useful non-water miscible solvents include diethyl ether, diisopropyl ether, and the like and benzene and toluene and the like.

The chlorocyanoalkylsilicon compounds that are useful as starting materials in the preparation of the chlorocyanoalkenylsilicon compounds of this invention are the chlorocyanoalkylchlorosilanes having the formula:

$$\left[ NC—\overset{Cl_2}{\underset{Cl_e}{C}}—\overset{H_{2-e}}{\underset{}{C}}—(CH_2)_c \right]_a —Si—Cl_{4-(b+a)}^{R_b}$$

where R, (a), (b), (c) and (e) have the above-defined meaning, and the sum of (a) and (b) is from 1 through 3. Such chlorocyanoalkylchlorosilanes are, for example, 2,2 - dichloro - 2 - cyanoethyltrichlorosilane, di - (2,2-dichloro - 2 - cyanoethyl)dichlorosilane, 2,2,1 - trichloro-2 - cyanoethylmethyldichlorosilane, 3,3 - dichloro - 3-cyanopropylphenyldichlorosilane, 4,4 - dichloro - 4-cyanobutyldimethylchlorosilane and the like. These chlorocyanoalkylchlorosilanes together with a method for their preparation are disclosed in copending application Serial No. 831,047, concurrently filed herewith.

The polychlorocyanoalkylchlorosilanes are prepared by reacting (2-cyanoethyl)chlorosilanes with chlorine gas in the presence of ultra-violet light and hydrogen chloride. The overall reaction can be depicted by the following equation which, for the purpose of illustration, shows the chlorination of (2-cyanoethyl)trichlorosilane:

(C) $NC—CH_2CH_2SiCl_3 + 2Cl_2 \xrightarrow[\text{Ultra-violet light}]{HCl}$
$NC—\overset{Cl_2}{\underset{}{C}}—\overset{H_2}{\underset{}{C}}—SiCl_3 + 2HCl$ (D) $NC—CCl_2—CH_2SiCl_3 + Cl_2 \xrightarrow[\text{Ultra-violet light}]{HCl}$
$NC—CCl_2—\overset{H}{\underset{Cl}{C}H}—SiCl_3 + HCl$ I have found that if the cyanoalkylchlorosilane is not treated with hydrogen chloride gas prior to the addition of the chlorine gas no polyalkylchlorination takes place. This process is more fully described in copending application Serial No. 831,047, concurrently filed herewith.

The chlorocyanoalkenylsilicon compounds of this invention are useful as steel on steel lubricants either alone or in admixture with other silicon compounds. The chlorocyanoalkenylmethylsilanes can be hydrolyzed and condensed or cohydrolyzed and cocondensed with other alkoxysilanes to obtain polymeric siloxanes. Such polymeric siloxanes are useful in the preparation of elastomers by compounding with a silica filler and curing with an aryl peroxide and they are useful as lubricants and lubricant additives. In addition the chlorocyanoalkenylsilicon compounds of this invention by virtue of their being ethylenically unsaturated can be polymerized with other unsaturated organic compounds by employing a diaryl peroxide, to yield modified resins that are useful as protective and decorative coatings.

The following examples serve to further illustrate my invention and are not to be construed as limitations thereon:

Example 1

A 3-liter three-necked Pyrex flask was equipped with a fritted glass gas diffuser, a low temperature condenser (cooled with solid carbon dioxide) and thermometer. A total of 2570 g. (13.6 moles) of 2-cyanoethyltrichlorosilane was charged to the flask and treated with dry hydrogen chloride gas at 10° C. until no more HCl appeared to be absorbed. An ultraviolet light source was directed on the flask and chlorine gas was bubbled in for 6 hours at such a rate as to maintain the reaction temperature between 70–80° C. At the end of this period nitrogen was bubbled through the reaction mixture for one hour to remove dissolved hydrogen chloride and chlorine. A weight increase of 459 g. was observed (equivalent to 13.3 moles of Cl), said increase in weight being due to the amount of chlorine reacted. The reaction product was distilled at atmospheric pressure through a 20 plate column. During the distillation copious amounts of hydrogen chloride were evolved. The atmospheric pressure distillation gave 2-chloro-2-cyanovinyltrichlorosilane and 2,2-dichloro-2-cyanoethyltrichlorosilane.

(1)
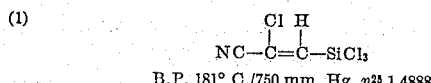

B.P. 181° C./750 mm. Hg, $n^{25}$ 1.4888

(2)
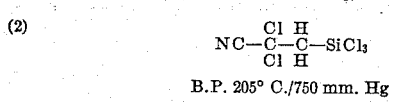

B.P. 205° C./750 mm. Hg

Infra-red survey and elemental analysis verifies compound 1 as being 2-chloro-2-cyanovinyltrichlorosilane structure and compound 2 as being 2,2-dichloro-2-cyanoethyltrichlorosilane.

Example 2

Into a 500 cc., three-necked flask fitted with mechanical stirrer, thermometer, condenser, and dropping funnel was placed 145 g. (0.66 mole) of

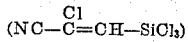

2-chloro-2-cyanovinyltrichlorosilane. The system was evacuated to 90 mm. of Hg pressure. Triethylorthoformate, 325 g. (2.17 moles) was added at room temperature (about 25° C.) over 45 minutes with vigorous stirring. The stirring was continued for 3 hours. Low boiling by-products of the reaction (ethyl chloride, ethyl formate, etc.) were removed by heating the system to 100° C. under 90 mm. pressure. The residue was charged to a 500 cc. distillation flask and distilled through a 50 cm. Vigreaux column at reduced pressure. The pure product 2-chloro-2-cyanovinyltriethoxysilane

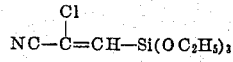

was obtained. (B.P. 57° C./0.5 mm. Hg, $n_D^{25}$ 1.4321; percent hydrolyzable chlorine; found, 14.2; theory, 14.2.)

Infra-red survey and elemental analysis verifies the product as being 2-chloro-2-cyanovinyltriethoxysilane.

Example 3

Two grams of 2-chloro-2-cyanovinyltrichlorosilane prepared as in Example 1 were added to 10 ml. of water and the mixture stirred. A solid product formed. This solid product was washed with distilled water until the water washings were neutral. The product was dried to a white powder and analyzed. Elemental analysis confirmed the product to be 2-chloro-2-cyanovinylpolysiloxane

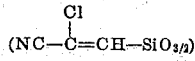

Example 4

A mixture of 2,2-dichloro-2-cyanoethyltrichlorosilane (about 152 g.) and 2-cyanoethyltrichlorosilane (about 109 g.), (prepared by treating hydrogen chloride treated 2-cyanoethyltrichlorosilane with chlorine for 2 hours in the presence of ultra-violet light), was charged into a distilling flask together with 0.2 g. of ferric chloride. The flask was heated slowly to a temperature of 212° C. During the heating hydrogen chloride and other unidentified low boiling materials were evolved. The residue in the flask was then distilled through a fractionating column under reduced pressure to yield 64 grams of 2-chloro-2-cyanovinyltrichlorosilane.

Example 5

2-cyanoethyltrichlorosilane (205 g., 1.09 mol.) and ferric chloride (2 g.) were charged into a 500 ml. flask fitted with a gas inlet tube, thermometer and gas outlet tube. Anhydrous hydrogen chloride was bubbled into the contents of the flask for 10 minutes at approximately 25° C. A weight gum of 3.6 grams, due to dissolved hydrogen chloride, was observed and a clear, yellow solution was obtained. Chlorine gas was then bubbled into the solution for a total of two hours, in the presence of diffuse sunlight. The temperature of the reaction was from 25° C. to 55° C. During the chlorine addition the solution became red. When the solution became red the chlorine addition was discontinued and the solution treated with anhydrous hydrogen chloride until the solution turned yellow. After the chlorine addition was completed (2 hours total addition) the solution was distilled under reduced pressure to yield 223 grams of a mixture of polychloro-2-cyanoethyltrichlorosilanes, said mixture was collected as a distillate boiling in the range 43° C. at 0.25 mm. Hg to 86° C. at 0.9 mm. Hg, $n_D^{25}=1.4730$ and 55.5% hydrolyzable chlorine.

The mixture of polychloro-2-cyanoethyltrichlorosilanes, prepared above was charged into a distilling flask and heated at atmospheric pressure. As the temperature approached approximately 185° C. chlorine and hydrogen chloride evolution took place. Subsequent fractionation of the reaction mixture yielded 2-chloro-2-cyanovinyltrichlorosilane. (B.P. 181° C.; $n^{25}$ 1.4897.)

By way of further example, a polymeric siloxane containing 2-chloro-2-cyanovinylsiloxy units and dimethylsiloxy units can be prepared by the cohydrolysis and cocondensation of 2-chloro-2-cyanovinyltriethoxysilane and dimethyldiethoxysilane by adding said silanes to water that is 0.1 normal with sodium hydroxide and stirring the resultant mixture for about two hours. The polymeric siloxane can be isolated by extracting the reaction mixture with diethyl ether and then removing the diethyl ether by evaporation at atmospheric pressure.

What is claimed is:

1. As a novel composition of matter an organosilicon compound having at least one silicon-bonded chlorocyanoalkenyl group of the formula:

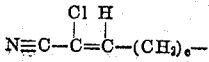

wherein (c) is an integer of from 0 through 4, said organosilicon compound is selected from the class consisting of (1) organosilanes having at least one valence of silicon, other than the valences satisfied by the chlorocyanoalkenyl group, satisfied by a member of the group consisting of, chlorine, fluorine and alkoxy groups, the remaining valences of silicon being satisfied by methyl and phenyl groups and (2) organosiloxanes having all the valences of the silicon atom containing said chlorocyanoalkenyl group, other than the valences satisfied by said chlorocyanoalkenyl group and siloxane linkages, satisfied by a member selected from the class consisting of methyl and phenyl groups and all remaining valences of silicon of said organosiloxane being satisfied by monovalent hydrocarbon groups.

2. As a novel composition of matter chlorocyanoalkenylsilanes of the formula:

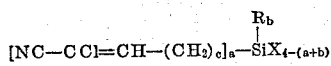

wherein R is a member of the class consisting of methyl and phenyl groups, X is a member of the class consisting of chlorine, fluorine, and alkoxy groups, (a) is an integer of from 1 through 3, (b) is an integer of from 0 through 2; the sum of (a) and (b) is from 1 through 3 and (c) is an integer of from 0 through 4.

3. As a novel composition of matter an organosilicon compound containing at least one unit of the formula:

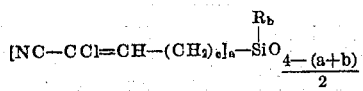

wherein R is a member of the class consisting of methyl and phenyl groups, (a) is an integer having a value of from 1 through 3, (b) is an integer of from 0 through 2, the sum of (a) and (b) is from 1 through 3 and (c) is an integer of from 0 through 4.

4. As a novel composition of matter an organosilicon compound consisting of at least one unit of the formula:

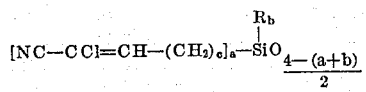

and at least one unit of the formula:

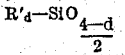

wherein R is a member of the class consisting of methyl and phenyl groups, R' is a monovalent hydrocarbon radical, (a) is an integer of from 1 through 3, (b) is an integer of from 0 through 2, the sum of (a) and (b) is from 1 through 3, (c) is an integer of from 0 through 4 and (d) is an integer of from 0 through 3.

5. 2-chloro-2-cyanovinyltrichlorosilane.
6. 2-chloro-2-cyanovinyltrialkoxysilane.
7. 2-chloro-2-cyanovinyltriethoxysilane.
8. 2-chloro-2-cyanovinylpolysiloxane.

9. A process for the production of chlorocyanoalkenylchlorosilanes of the formula:

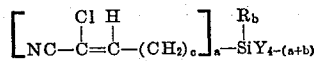

wherein R is a member of the class consisting of methyl and phenyl groups, Y is a member of the class consisting of chlorine and fluorine, (c) is an integer of from 0 through 4, (a) is an integer of from 1 through 3, (b) is an integer of from 0 through 2, the sum of (a+b) being from 1 through 3 which comprises heating a polychlorocyanoalkylchlorosilane of the formula:

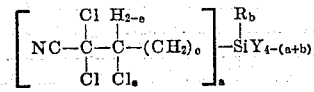

wherein R, Y, (a), (b), and (c) are as above defined, (e) is an integer of from 0 through 1, to a temperature sufficiently elevated so as to cause the evolution of at least one member of the group consisting of hydrogen chloride and chlorine molecules to form said chlorocyanoalkenylchlorosilanes.

10. A process for the production of 2-chloro-2-cyanovinyltrichlorosilane which comprises heating 2,2-dichloro-2-cyanoethyltrichlorosilane to a temperature sufficiently elevated so as to cause the evolution of hydrogen chloride.

References Cited in the file of this patent

FOREIGN PATENTS 1,118,500   France   Mar. 19, 1956